United States Patent

[11] 3,607,113

[72] Inventor Richard Henry Featherston
Benton, Ark.
[21] Appl. No. 816,456
[22] Filed Feb. 24, 1969
Division of Ser. No. 513,518, Dec. 13, 1965, abandoned
[45] Patented Sept. 21, 1971
[73] Assignee Reynolds Metals Company
Richmond, Va.

[54] CONTINUOUS PRECIPITATION OF ALUMINA HYDRATE
4 Claims, 3 Drawing Figs.
[52] U.S. Cl. ................................................. 23/273, 23/141
[51] Int. Cl. ................................................. B01d 9/02
[50] Field of Search .......................................... 23/273

[56] References Cited
UNITED STATES PATENTS

| | | | |
|---|---|---|---|
| 1,331,373 | 2/1920 | Prache | 23/273 |
| 3,205,047 | 9/1965 | Otsuki et al. | 23/273 |
| 2,606,820 | 8/1952 | Harms | 23/273 |
| 2,653,858 | 9/1953 | Brown | 23/273 |
| 2,707,669 | 5/1955 | Houston et al. | 23/273 |

Primary Examiner—Norman Yudkoff
Assistant Examiner—Curtis P. Ribando
Attorney—Glenn, Palmer, Lyne, Gibbs & Thompson ABSTRACT: This invention relates to a process for the continuous precipitation of alumina hydrate from aluminate liquors. More particularly, the invention relates to an improved process for continuously precipitating and separating from aluminate liquors, alumina hydrate particles characterized by spherical shape, high density and such coarseness that not less than 85 percent by weight of the product is plus 200 mesh size.

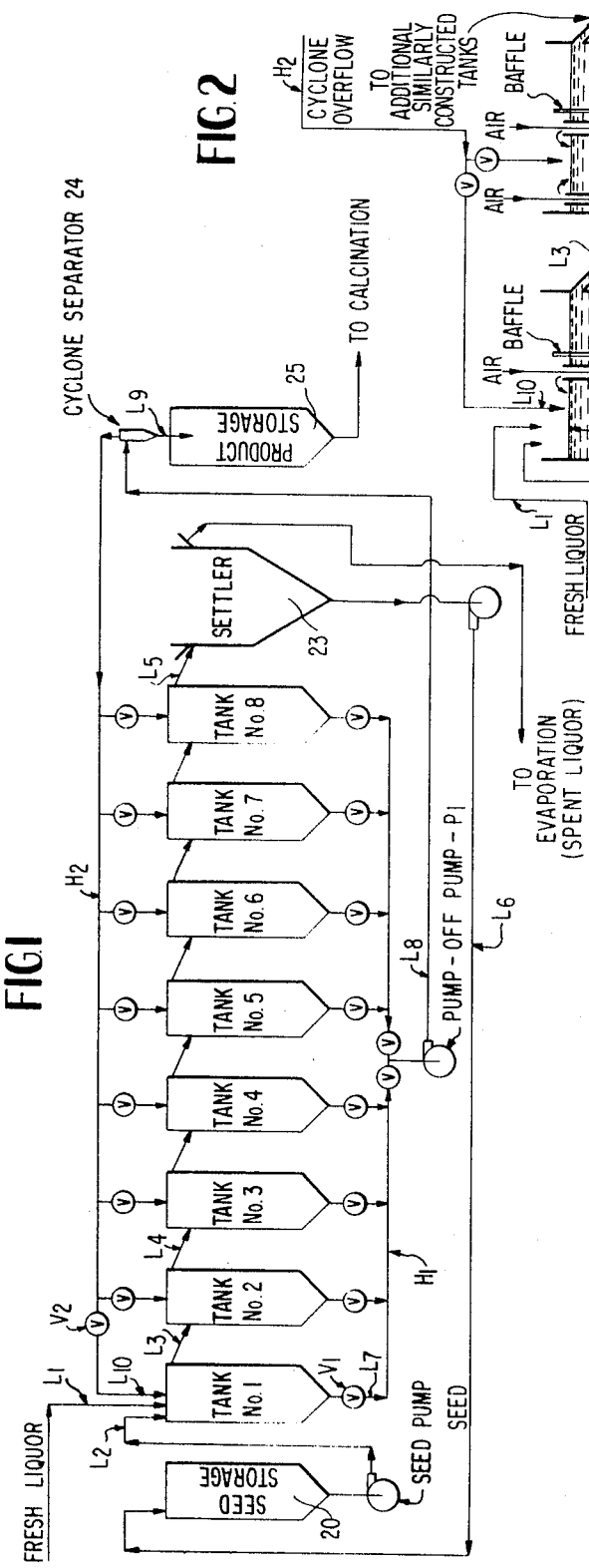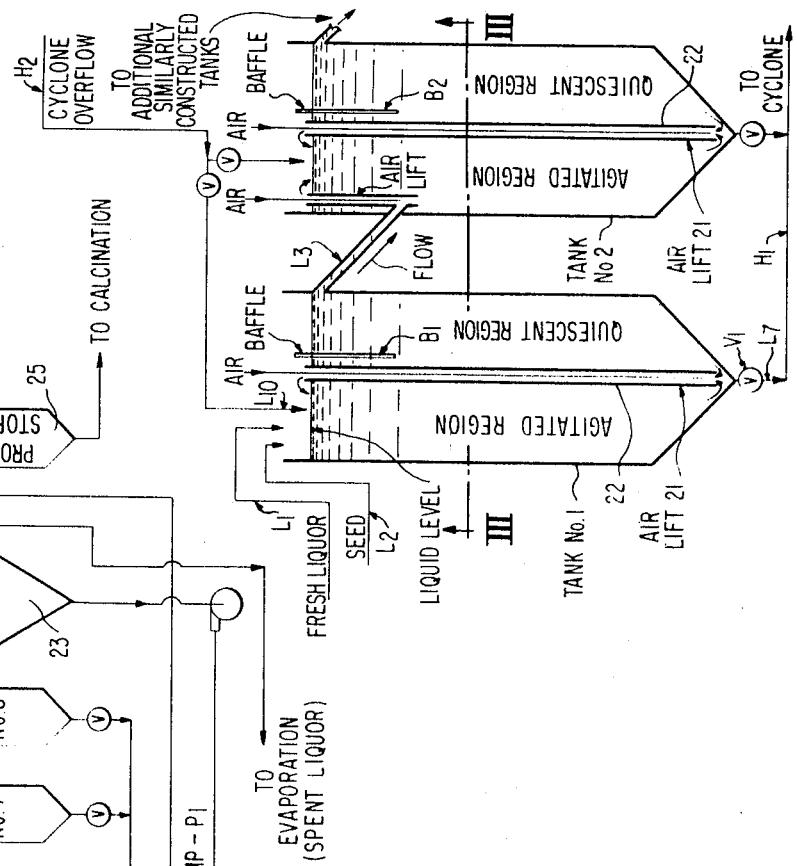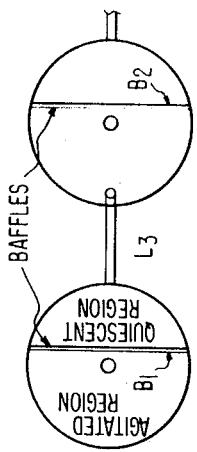
INVENTOR
RICHARD H. FEATHERSTON
ATTORNEYS

CONTINUOUS PRECIPITATION OF ALUMINA HYDRATE

This application is a division of Ser. No. 513,518, filed Dec. 13, 1965, now abandoned.

The most widely used process for making alumina hydrate consists in seeding a batch of super-saturated sodium aluminate solution with alumina hydrate crystals and precipitating out the dissolved alumina for a predetermined time. By proper control of the seed charge, initial alumina to caustic soda concentration ratio, temperature and period of precipitation, it has been possible to precipitate economically about 50 percent of the dissolved alumina from a given batch of aluminate solution. The product from precipitation is then pumped through a series of classifiers and settlers to separate the alumina hydrate from the spent liquor and also to produce three fractions of alumina hydrate of varying particle size. The coarse fraction which usually has about 65 percent of its weight coarser than 200 mesh size is filtered, washed and calcined in a rotary kiln to produce alumina suitable for electrolytic reduction to aluminum metal. The two finer fractions of alumina hydrate are recycled as seed for precipitation of a fresh batch of aluminate liquor.

A coarser product, that is, substantially all plus 200 mesh size, has several advantages. It reduces the dust loss on calcination, transport and use in the electrolytic cells for aluminum metal production. It permits of high temperature calcination without mineralizers to develop more than 90 percent alpha-alumina phase in the product, needed for various nonmetallurgical applications of alumina such as in refractories, ceramics, abrasives, catalysts, and the like.

In the conventional process for precipitating alumina hydrate it has not been possible to produce economically alumina hydrate particles much coarser than about 65 percent by weight over 200 mesh size. A coarser product can be made by further classification of the product but it would result in more production of the fine fraction which cannot be fully utilized as seed, thus building up a seed inventory. In the initial phase of the precipitation cycle, considerable growth occurs and if precipitation is terminated after a few hours it will be possible to produce a coarser alumina hydrate. But this method has the disadvantage that only a small fraction of the dissolved alumina is precipitated, thus resulting in an uneconomical liquor productivity.

Several attempts have been made in the past to produce coarse alumina hydrate by combination of precipitation and classification techniques. One such method of producing a coarse alumina hydrate is described in U.S. Pat. No. 2,707,669. In this method, after precipitation in one precipitator, a coarse fraction is separated and used as seed in a second precipitator with fresh liquor. By successive precipitation and classification it is disclosed that a coarse product consisting of not less than 70 percent by weight on plus 200 mesh can be produced. The method has the disadvantages of using many classifiers, pumping large volumes of liquor and seed fractions, and low liquor productivity. Continuous precipitation has been attempted in the past, but the product turns finegrained (i.e., 5-10 percent by weight retained on 200 mesh), and is unsuitable for regular rotary kiln calcination without using mineralizers and expensive dust collecting equipment.

It is, therefore, a primary object of this invention to improve continuous precipitation of alumina hydrate in order to produce alumina hydrate particles not less than 85 percent by weight plus 200 mesh size, and at the same time to precipitate about 50 percent of the dissolved alumina from the aluminate liquor, which is comparable in liquor productivity to batch precipitation.

In the conventional precipitation, particles grow by agglomeration of small particles resulting in a product of irregular shape and low bulk density. There is a growing demand for alumina of high bulk density and having spherical shape conductive to better flowability and easy handling.

Therefore, another object of this invention is to control the precipitation process facilitating the production of spherically shaped, high bulk density alumina hydrate particles.

According to the present invention, it was found that alumina hydrate substantially spherical in shape, high in bulk density, and substantially all coarser than 200 mesh size, can be precipitated from supersaturated aluminate liquors by conducting the precipitation in a continuous system wherein the fresh liquor and seed enter the first precipitator in a sequence of specially designed precipitators connected in series to provide precipitation stages, each precipitator containing aluminate liquor lower in ratio of alumina to caustic soda concentration than the preceding precipitator but higher in ratio than the succeeding precipitator and wherein the liquor enters the precipitation stage in each precipitator in an agitated region of high seed density and leaves by gravity flow from a quiescent region and wherein the precipitated liquor having reached a predetermined solid volume concentration is periodically pumped across a cyclone separator so that the cyclone underflow is recovered as the desired course product and the cyclone overflow is recycled to the precipitator being pumped in such manner that a constant liquor level is maintained in the precipitator and wherein the precipitated alumina hydrate accounts for about 50 percent of the dissolved alumina originally entering the system in the fresh liquor. Solid volume concentration is determined by taking a sample of 100 cc. of liquor, allowing it to settle, and measuring the settled volume of the solid content.

The practice of the invention will be more clearly understood by reference to the accompanying drawings in which:

FIG. 1 is a schematic diagram showing the arrangement of precipitators and other elements of the apparatus and the movement of material therethrough in a continuous system in flow sheet form;

FIG. 2 is a view in elevation showing the constructed of two precipitators and their interconnections; and FIG. 3 is a view in vertical section of the precipitators taken along the line 2-2 of FIG. 2.

Referring to FIG. 1, there is illustrated a continuous precipitation system comprising eight precipitators connected in series. Fresh aluminate liquor (supersaturated sodium aluminate liquor) is metered continuously at a definite flow rate and enters the first precipitator, designated as Tank No. 1 at the top through line $L_1$. Seed from the seed storage tank 20 is metered continuously at a definite flow rate and enters Tank No. 1 at the top through line $L_2$. Tank No. 1 is previously filled with an aluminate liquor having a ratio ($Al_2O_3$/free soda, wherein free soda is caustic soda expressed as $Na_2CO_3$) less than the ratio of fresh liquor entering Tank No. 1. Both the seed slurry and fresh liquor enter a region of Tank No. 1 which is kept in agitation by a conventional air lift 21, as shown in FIG. 2 located at the center of the tank. The air lift comprises a pair of concentric pipes, air being supplied through the inner pipe and air-liquor mixture moving upward through the annular space between the pipes.

In the precipitators, the agitated slurry region is separated from a quiescent region by means of a vertical baffle B-1, shown in FIG. 2, located slightly offcenter and extending a short distance into the tank from its top. Liquor from Tank No. 1 overflows from the quiescent region by gravity continuously through line $L_3$ into Tank No. 2, which contains aluminate liquor lower in ratio than that in Tank No. 1. Tank No. 2 is also provided with air lift 21 and vertical baffle B-1 as in Tank No. 1, so that it also has an agitated region and a quiescent region. The overflow line $L_3$ enters Tank No. 2 in the agitated region. From the quiescent region in Tank No. 2, the liquor overflows continuously by gravity through Line $L_4$ into the agitated region in Tank No. 3. Each precipitation tank in the series is similarly equipped with a conventional airlift and a baffle, thus providing an agitated region and a quiescent region. The liquor from the preceding tank overflows into the agitated region of the next tank in the series and flows out from the quiescent region of the tank. Thus, the liquor flows continuously through the system and finally leaves the precipitation system from Tank No. 8 through line $L_5$ passing to settler 23 wherein the fine alumina hydrate settles to the bottom and is separated from the spent liquor which is pumped to the evaporators for conventional processing. The settled fine alumina hydrate from the settler is pumped through line $L_6$ into the seed storage tank 20, from which the seed slurry is supplied to Tank No. 1 by pumping through line $L_2$.

When precipitation has proceeded for a few hours in Tank No. 1, the solid volume in the tank increases due to seed growth. When a sample of slurry taken from the agitated region shows a settled solid volume of about 50 percent, the tank is ready for removal of precipitated slurry. Referring to Tank No. 1, valve $V_1$ at the bottom of the tank is opened and the precipitated slurry flows through line $L_7$ to a common header $H_1$, connected to pump off pump $P_2$. which pumps the slurry to a cyclone separator 24 through line $L_8$. At the cyclone the slurry is separated into an underflow containing coarse alumina hydrate and an overflow containing fine alumina hydrate. The underflow passes through line $L_9$ into the product storage tank 25 from where it is pumped for subsequent processing involving filtration, washing and calcination. The overflow from cyclone 24 containing fine alumina hydrate flows through the common header $H_2$ and enters Tank No. 1 in the agitated region through valve $V_2$ and line $L_{10}$. The liquor level in Tank No. 1 is thus maintained constant.

As the pumping from Tank No. 1 proceeds, the solid volume in the tank decreases and when a sample of slurry taken from the agitated region shows a settled volume of about 30 percent, the pump-off from Tank No. 1 is stopped by closing off valves $V_1$ and $V_2$. Each tank is connected through valves and lines to the common pump-off header $H_1$ and common cyclone overflow line $H_2$, so that each tank can be pumped across the cyclone when it is ready for pump-off and the coarse alumina hydrate production from each tank can be recovered and the cyclone overflow recycled to the tank on pump-off.

As mentioned before, the alumina hydrate produced from the process of this invention is spherical in shape and has a high bulk density. These properties are achieved by the unique method of precipitation and crystal growth facilitated by the design of the precipitator and the flow pattern of the liquor therein. This aspect of the invention is better understood by reference to FIG. 2, which is a schematic representation of Tank No. 1 and Tank No. 2 in the continuous system.

Line $L_1$ brings in the fresh liquor (supersaturated aluminate liquor) and line $L_2$ brings in the seed to Tank No. 1 as described in reference to FIG. 1. Tank No. 1 has a conventional air lift 21 for agitation located in the center of the tank and a baffle B-1 located slightly offcenter. Baffle B-1 separates the agitated region (into which the entry of liquor and seed takes place) from the quiescent region from which the liquor from Tank No. 1 overflows by line $L_3$ to Tank No. 2.

On account of the vigorous agitation, the alumina hydrate particles are kept in constant motion and fresh alumina hydrate formed by hydrolysis of the sodium aluminate solution is slowly deposited on the surface of the particles thereby achieving a layer by layer growth conductive to a spherical shape of the particle.

In conventional precipitation, the initial stage of precipitation is quite rapid on account of the initial high ratio of alumina to caustic soda concentration and the freshly precipitated alumina hydrate acts as a binder agglomerating smaller particles forming an irregular shaped product.

In the process of this invention the precipitation takes place from a comparatively lower ratio liquor and therefore the rate of precipitation is slower. Moreover, the precipitation takes place from a liquor of fairly constant ratio as contrasted with the precipitation in a conventional precipitator wherein the ratio is changing all the time, giving rise to changing precipitation rates.

In the agitated region of Tank No. 1, constant growth of the alumina hydrate crystal takes place while in the quiescent region the coarse particles stay at the bottom and the fines are carried to the top by the upward flow of the liquor. The coarse particles are carried by the air lift and deposited on the agitated side and further growth takes place until the seed volume in that region reaches about 50 percent when further growth causes sedimentation. At this point, Tank No. 1 is pumped to the cyclone for separation of the grown coarse particles as described before and the cyclone overflow recycles back into the tank on the agitated side. The overflow contains fine hydrate particles which are thus returned for further growth. Alumina hydrate particles which rise with the liquor on the quiescent side of the tank are substantially minus 200 mesh in size and act as seed for Tank No. 2.

The overflow line $L_3$ from Tank No. 1 is connected to a short air lift in Tank No. 2 to maintain a pumping action of the overflow liquor from Tank No. 1. This short air lift is optional, as many other means of liquor transfer can be incorporated in the system without affecting the basic features of this invention. Thus, the overflow line $L_3$ can be made large in size to maintain the desired upward flow in Tank No. 1. Or else Tank No. 2 can be located at a lower elevation than Tank No. 1 and by properly locating the overflow line $L_3$ on Tank No. 1, a head pressure can be created for discharge of liquor into Tank No. 2 and also maintaining the classifying upward liquor velocity in Tank No. 1 so that only substantially fine hydrate particles, that is, lower than 200 mesh size are removed from Tank No. 1 with the overflow liquor.

In summary, therefore, the invention concerns a method for the continuous precipitation of alumina hydrate from aluminate liquor in a system including a sequence of precipitation stages, comprising the steps of:

a. providing a series of at least two precipitation stages, each stage containing aluminate liquor lower in ratio of alumina to caustic soda concentration than the preceding stage but higher in ratio than the succeeding stage;

b. introducing into an agitated zone of the first precipitation stage fresh aluminate liquor and seed slurry;

c. maintaining in each precipitation stage an agitated region and a quiescent region of the charge;

d. periodically withdrawing precipitated alumina hydrate from the first precipitation stage;

e. continuously removing aluminate liquor and fine alumina hydrate particles from said quiescent region of said first stage to the agitated region of the second stage;

f. periodically withdrawing precipitated alumina hydrate from the second and successive stages while continuously transferring aluminate liquor from the quiescent region of the second stage to the agitated region of the next successive stage, and continuing this sequence of withdrawal and transfer until a predetermined number of precipitation stages is completed;

g. separating from the precipitates of the respective stages the coarse alumina hydrate product; and h. recycling the residual liquor and the entrained fine alumina hydrate particles to the agitated region of the respective precipitation stages to maintain a substantially constant liquor level therein.

The operation of the foregoing precipitation system gives a consistently uniform produce of the desired coarse particle size.

The $Al_2O_3$/free soda ratio remains constant in each precipitation stage, but drops from the first stage to the next in the series. The actual ratio in each stage is dependent upon the initial ratio of the fresh liquor, as well as the rate of flow, and the temperature of the fresh liquor, and the seed flow rate. Thus, if the flow rate of the fresh liquor is increased, all the other variables remaining the same, the retention time in each stage is less, and the ratios in each stage will be higher than those corresponding to the lower flow rate. Since the ratio at the finish, that is, the liquor in the last stage, will be higher under these conditions, it will be apparent that the liquor productivity will be lower than that achieved at the lower flow rate.

If the initial ratio of the fresh liquor is changed, a different set of ratio conditions will be established in each precipitation stage, by the operation of the system, but in general the ratio in each stage remains consistently the same, accompanied by a fairly constant drop in ratio from one stage to the next.

The method of the invention is applicable in general to the precipitation of aluminate liquors from the Bayer process and is not limited to the production of coarse alumina hydrate particles. Thus, for example, using the process of the invention, it is possible to produce an alumina hydrate comparable in particle size to that obtained by conventional precipitation by control of the cyclone separation operation.

While the precipitation stage has been described with reference to a precipitation tank having a baffle physically dividing it into two partially communicating regions, with agitation on one side of the baffle only, an equivalent arrangement can be provided by using two separate tanks, only one of which includes means for agitating the liquor. In this instance, the outflow of the quiescent tank would be transferred back and incorporated in the feed to the agitated tank.

The following example illustrates the practice of the invention, but is not to be regarded as limiting:

EXAMPLE

A precipitation system corresponding to that illustrated in FIG. 1 was employed, comprising eight precipitating tanks, each holding approximately 200,000 gallons of aluminate liquor. Each precipitator tank had a diameter of 24 feet and each baffle had a chord length of 23 feet-7 inches and depth of 12 feet. The agitated region represented about 61 percent of the area and the quiescent region about 39 percent.

Fresh liquor (supersaturated aluminate liquor) was maintained at a flow rate of 200 tons per hour and a temperature of about 160° F. It had an $Al_2O_3$/free soda ratio of 0.62. The seed rate was maintained at 11 tons per hour of solids and the seed slurry had a specific gravity of about 1.40. The total retention time of liquor in the continuous system was about 30 hours. The spent liquor from the last tank in the series showed an $Al_2O_3$/ree soda ratio of about 0.36 and an exit temperature of about 130° F. The quantity of coarse alumina hydrate from the first precipitator was about 45 percent of the total production and that from the last precipitator was about 5 percent, the precipitators in between contributing the remaining 50 percent.

In a set of four runs, using fresh liquor having a ratio of $Al_2O_3$/ree soda of 0.641, average ratio values obtained in the first, sixth and eighth tanks or stages were:

TABLE I

| Fresh Liquor | 1st Stage | 6th Stage | 8th Stage |
| --- | --- | --- | --- |
| 0.641 | 0.517 | 0.372 | 0.371 |
| 0.641 | 0.525 | 0.393 | 0.377 |
| 0.641 | 0.516 | 0.395 | 0.380 |
| 0.641 | 0.512 | 0.390 | 0.367 |
| Average: | 0.518 | 0.387 | 0.371 |

The foregoing figures, obtained under large scale operating conditions, are remarkably consistent, and confirm that one of the characteristics of the method is the attainment of fairly constant ratios in each precipitator, and therefore a fairly constant drop in ratio proceeding from one stage to the next.

The use of baffles in each precipitator is another favorable factor. Without the baffles, considerable channeling of liquor takes place and it is found that liquor productivity is about 25 percent less.

The coarse alumina hydrate product from the system had the following properties:
Shape: Spherical
Screen Analysis
+100 mesh 31.0 percent
+200 mesh 91.4 percent
+325 mesh 98.8 percent
−325 mesh 1.2 percent
Bulk Density: 80 lbs./cu.ft.

The fine product (seed) had the following screen analysis:
+100 mesh 4.8 percent
+200 mesh 40.2 percent
+325 mesh 83.2 percent
−325 mesh 16.8 percent The following Table II gives a comparison of the product from the process of this invention and that from a conventional batch precipitation.

TABLE II

|  | Continuous precipitation | | | Batch precipitation | | |
| --- | --- | --- | --- | --- | --- | --- |
|  | +100 mesh | +200 mesh | +325 mesh | +100 mesh | +200 mesh | +325 mesh |
| Alumina hydrate: | | | | | | |
| Screen analysis, percent | 29 | 93 | 98 | 4 | 57 | 94 |
| Bulk density, lbs./cu. ft. | | 79–80 | | | 68–69 | |
| Particle shape | | Spherical | | | Irregular | |
| Calcined alumina: | | | | | | |
| Screen analysis, percent | 25 | 93 | 99 | 5 | 63 | 95 |
| Bulk density, lbs./cu. ft. | | 57–49 | | | 51–52 | |

NOTE.—The calcined aluminas produced from the two types of alumina hydrate (calcined under identical conditions) were ground in a ball mill and the crystallite size distributions were determined. The results are shown below.

|  | Alumina from continuous precipitation | Alumina from batch precipitation |
| --- | --- | --- |
| Plus 30 microns | 0 | 0 |
| Plus 20 microns | 0 | 0 |
| Plus 10 microns | 0.9 | 0 |
| Plus 5 microns | 20.2 | 11.1 |
| Plus 3 microns | 49.4 | 27.8 |
| Plus 2 microns | 68.1 | 50.0 |
| Plus 1 micron | 87.9 | 75.0 |
| Plus .5 micron | 97.8 | 91.7 |

NOTE.—It will be noted from this comparison of properties that the product of this invention is not only courser and denser, but the alumina produced from it has a larger crystallite size.

I claim:
1. Apparatus for the continuous precipitation of alumina hydrate from aluminate liquor comprising:
   1. a plurality of precipitation tanks arranged in series including first and last tanks and a plurality of intermediate tanks, each tank having a baffle extending downwardly into the tank at the upper end thereof;
   2. an inlet for introducing liquor into each tank on one side of the baffle;
   3. an upper outlet opposite the baffle on the other side thereof from said inlet;
   4. said baffle being disposed between the center axis of each precipitation tank and each said outlet and extending across the precipitation tank with the upper part of the baffle being above the outlet and the lower part of said baffle spaced from the bottom of each precipitation tank;
   5. means for circulating liquor and entrained solids in each tank; and
   6. means connecting the inlet of the last and each intermediate tank respectively with the upper outlet of a preceding tank for continuously passing aluminate liquor through said series of tanks; whereby said upper outlet provides for continuous removal of overflow liquor and entrained alumina fines from each tank to the next succeeding tank, and said baffles and circulating means are disposed in such manner that the particles which are carried upwardly and discharged on the inlet side of said baffle are retained to enhance particle growth while particles carried upwardly and discharged on the outlet side of said baffle are removed through each overflow outlet;

7. means for periodically removing a slurry of aluminate liquor and precipitated substantially coarse alumina hydrates from said tanks in parallel paths, said means including a lower outlet from the bottom of each tank;
8. valve and conduit means for passing the slurry of aluminate liquor and coarse alumina hydrate removed from said lower outlet of each tank to separator means without comingling with the overflow removed from the top of said tanks;
9. separator means for the separation and recovery of the coarse precipitated alumina hydrate from the removed slurry; and
10. valve and conduit means for passing the residual liquor of said removed slurry from said separator means back to said tanks; whereby said separator means and lower outlet are employed as the sole means for the recovery of coarse alumina hydrate product from each of said tanks individually and, whereby said slurry and said coarse particles are periodically removed from each tank so as to maintain a solids concentration of about 30 percent to about 50 percent in each tank.

2. Apparatus according to claim 1 including means for passing overflow liquor from said last tank to settler means for separation of fine particles of alumina hydrate from spent liquor and means for recirculating said fine particles as seed particles.

3. Apparatus according to claim 2 wherein said means for circulating the liquor in each tank comprises an air lift having a pair of concentric pipes, air being supplied through the inner pipe and an air-liquor mixture moving upward through the annular space between the pipes.

4. Apparatus according to claim 3 wherein said separator means comprise a cyclone separator for the recovery of said coarse alumina hydrate product.